Patented Oct. 7, 1947

2,428,758

UNITED STATES PATENT OFFICE 2,428,758

ANTHRIMIDE CARBAZOLE THIOXAN-
THONES DERIVED FROM 3.2-(S)-1'.2'-
(S)-6'-HALOGEN THIOXANTHONES

Fritz Max, Easton, Pa., and David I. Randall,
Phillipsburg, N. J., assignors to General Aniline
& Film Corporation, New York, N. Y., a corporation of Delaware No Drawing. Application December 12, 1946,
Serial No. 715,652

4 Claims. (Cl. 260—316)

The present invention relates to anthrimide carbazole thioxanthone dyes and more particularly to such compounds in which the phthaloyl thioxanthone employed in the formation thereof is a 2.3-phthaloyl thioxanthone.

Thioxanthones and their simply substituted derivatives have little utility as dyestuffs because they are weakly colored compounds with very little affinity for textile fibers (see German Patents 243,587 and 231,854). More complex derivatives have been made from said compounds by reacting the same with anthraquinones. For instance, in German Patent 231,854, 1-amino-5,6-anthraquinone thioxanthone is condensed with α-chlor anthraquinone, resulting in the substitution of the nitrogen atom in 1-position by an anthraquinone nucleus. The corresponding U. S. Patent 999,785 emphasizes that these more complex products dye cotton in shades ranging from red to grayish blue.

In our copending application Serial No. 629,196, filed November 16, 1945, entitled "Vat dyes of the anthrimide carbazole thioxanthone type," it has been suggested to produce anthrimide carbazole thioxanthones by condensing a 1-amino anthraquinone with an anthraquinone thioxanthone and ring closing the resulting anthraquinonyl derivative to a carbazole. Such compounds are said to dye textile fibers, particularly cotton, in shades ranging from orange to red-brown. However, in the preparation of such compounds there is employed a 1.2-phthaloyl thioxanthone or, better stated, an anthraquinone-2.1-(S)-1'.2'-(S)-thioxanthone.

We have now found that anthraquinone carbazole thioxanthones capable of dyeing vegetable fibers in orange to brown shades can be obtained by condensing a 2.3-phthaloyl thioxanthone (3.2-(S)-1'.2'-(S)-6'-halogen thioxanthone) with a 1-amino-anthraquinone and ring closing the resulting condensation product to a carbazole.

Such compounds and their preparation represent the purposes and objects of the present invention.

The compounds which are contemplated herein have the following structural formula:

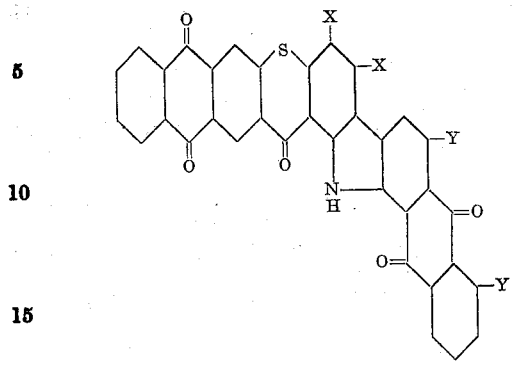

wherein X is hydrogen, halogen such as chlorine, bromine, fluorine or the like, alkyl such as methyl, ethyl, propyl, butyl, amyl, octyl, cetyl and the like, alkoxy such as methoxy, ethoxy, propoxy, butyroxy and the like, aryl such as phenyl, naphthyl, toluyl, anisyl and the like, or aryloxy such as phenoxy and the like, and Y is hydrogen, alkoxy as above or a benzamido radical such as benzamido, p-chlorbenzamido, p-brombenzamido, toluylamido, p-methoxy benzamido and the like.

The new compounds are prepared by condensing a 3.2(S)-1'.2'-(S)-6'-halogen thioxanthone with a 1-amino anthraquinone which may be substituted in the 4- or 5-positions by an alkoxy or benzamido group and ring closing the resulting compound. The condensation between the thioxanthone and the 1-amino anthraquinone is effected by heating the reactants to a temperature ranging from about 190 to 250° C. in the presence of an acid acceptor such as soda ash, sodium acetate, potassium carbonate, and the like, and copper or a copper salt such as copper acetate, and the like.

The condensation product is ring closed by heating it to a temperature ranging from about 50 to 125° C. in the presence of an acid condensing agent. For the latter purpose, there may be employed an acid such as concentrated sulfuric acid, chlorsulfonic acid or the like. We have found, however, that best results ensue when utilizing as the acid condensing agent a metal chloride in the presence of a non-basic organic solvent. Satisfactory metal chlorides are aluminum chloride, ferric chloride and the like. Examples of the non-basic organic solvents are nitrobenzene, nitrotoluene, dinitrobenzene, tetrachlorethane, chlorbenzene and the like.

The thioxanthone utilized as parent material is prepared by condensing a 5-chlor thiophenol with 2-chloro-3-anthraquinone carboxylic acid and ring closing the resulting thioxanthone. For ring closure, the conditions and condensing agents mentioned above may be utilized.

Examples of compounds contemplated by the present invention are listed below. For the sake of brevity, the nomenclature subsequently used indicates the particular substituents in the following formula:

(1)
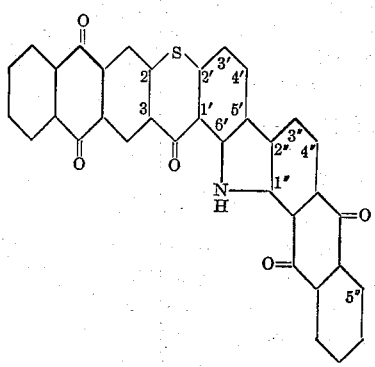

2. This compound is the same as that of the above formula excepting that the 3'-position is substituted by chlorine and the 5''-position by benzamido.

3. This compound is the same as that of Formula 1 excepting that the 3'-position is substituted by chlorine and the 4''-position by benzamido.

4. This compound is the same as that of Formula 1 excepting that the 3'-position is substituted by methoxy and the 4''-position by benzamido.

5. This compound is the same as that of Formula 1 excepting that the 3'-position is substituted by methyl and the 4''-position by benzamido.

6. This compound is the same as that of Formula 1 excepting that the 3'-position is substituted by methyl, the 4'-position by chlorine, and the 5''-position by methoxy.

7. This compound is the same as that of Formula 1 excepting that the 3'-position is substituted by methoxy and the 4''-position by p-chloro benzamido.

8. This compound is the same as that of Formula 1 excepting that the 3'-position is substituted by phenoxy and the 5''-position by ethoxy.

9. This compound is the same as that of Formula 1 excepting that the 3'-position is substituted by bromine and the 5''-position by toluylamino.

10. This compound is the same as that of Formula 1 excepting that the 3' and 4'-positions are substituted by chlorine and the 4''-position by benzamido.

11. This compound is the same as that of Formula 1 excepting that the 4'-position is substituted by phenyl and the 5''-position by benzamido.

The following examples serve to further explain the invention, the parts being by weight unless otherwise stated. It is to be understood, however, that the examples are illustrative and not limitative of the invention.

*Example I*

| | Parts |
|---|---|
| Anthraquinone 3.2 - (S) -1'.2'- (S) -3',6'-dichlorothioxanthone | 6.0 |
| 1-amino-5-benzamidoanthraquinone | 5.2 |
| Anhydrous sodium carbonate | 5.0 |
| Copper acetate | 0.5 |
| Nitrobenzene | 100 | are heated for 5 hours at 205–210° C. The red crystalline condensation product is filtered at 25° C. and washed with alcohol, dilute hydrochloric acid and water. The yield is excellent. This anthrimide has no affinity for cotton when applied as a vat dyestuff. It dissolves in concentrated sulfuric acid giving a bright cherry-red color.

For carbazolation, 8.0 parts of the anthrimide are dissolved in 100 parts of 100% sulfuric acid. The solution is heated to 74–79° C. for 1 hour. The dyestuff is isolated by pouring into ice and water, followed by filtration and washing. The dyestuff may be brightened in the usual fashion by treating the paste with sodium dichromate or sodium hypochlorite. Cotton is dyed by this product in brownish golden orange shades.

*Example II*

| | Parts |
|---|---|
| Anthraquinone - 3.2 - (S) -1'.2'-(S) -3',6'-dichlorthioxanthone | 8.0 |
| 1-amino-4-benzamidoanthraquinone | 7.2 |
| Soda ash | 6.0 |
| Copper acetate | 1.0 |
| Nitrobenzene | 130 | are heated for 3 hours at 210° C. The black anthrimide crystals are filtered off at 30° C. and washed with alcohol, dilute hydrochloric acid and water. It is substantive to cotton, dyeing olive shades from a violet brown vat.

For carbazolation 6.0 parts of the above anthrimide are dissolved in 100 g. of 100% sulfuric acid. The solution is heated for 1 hour at 74–79° C. During the heating, the color changes from brown to violet. The dyestuff is worked up as in Example I. Cotton is dyed by this product in orange brown shades of very good fastness properties.

*Example III*

| | | |
|---|---|---|
| Anthraquinone - 3,2 - (S)-1'.2'-(S) -3'-methoxy-6'-chlorthioxanthone | Parts | 10.0 |
| 1-amino-4-benzamidoanthraquinone | do | 9.2 |
| Copper acetate | gram | 1.0 |
| Soda ash | Parts | 8.0 |
| Nitrobenzene | do | 120 | are heated together for 3 hours at 210° C. The violet crystalline product is worked up as in Example I. The anthrimide dissolves in sulfuric acid with a green coloration and dyes cotton olive green shades from a violet vat.

For carbazolation 12.0 parts of the anthrimide are dissolved in 130 parts of 100% sulfuric acid. The solution is heated to 74–75° C. for ½ hour and then worked up as in Example I. The dyestuff yields yellow brown shades on cotton of good fastness properties.

Various modifications of the invention will occur to persons skilled in the art and we therefore do not intend to be limited in the patent granted except as necessitated by the prior art and the appended claims.

We claim:
1. Compounds of the following formula:

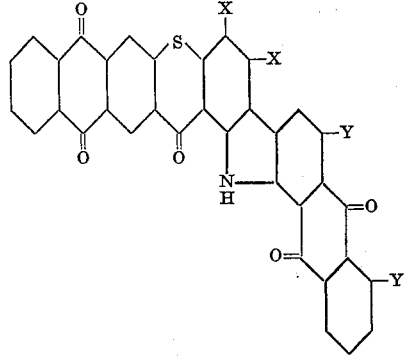

wherein X is a member selected from the class consisting of hydrogen, halogen, alkyl, aryl, alkoxy and aryloxy, and Y is a member selected from the class consisting of hydrogen, alkoxy and a benzamido radical, said compounds dyeing vegetable fibers in shades ranging from orange to brown of excellent fastness properties.

2. The compound of the following formula:

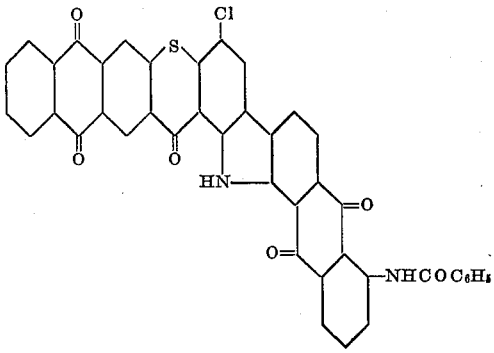

capable of dyeing cotton in brownish golden orange shades of excellent fastness properties.

3. The compound of the following formula:

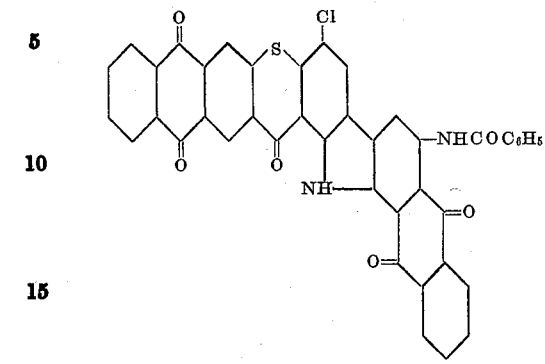

capable of dyeing cotton in orange-brown shades of excellent fastness properties.

4. The compound of the following formula:

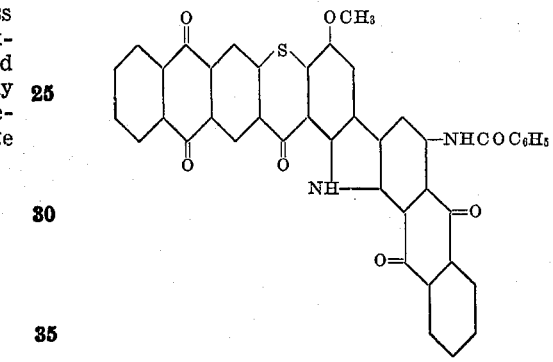

capable of dyeing cotton brown shades of excellent fastness properties.

FRITZ MAX.
DAVID I. RANDALL.

Certificate of Correction

Patent No. 2,428,758.  October 7, 1947.

FRITZ MAX ET AL.

It is hereby certified that errors appear in the printed specification of the above numbered patent requiring correction as follows: Column 6, lines 11 and 29, claims 3 and 4, in the formulae, for "NH" read *HN*; and that the said Letters Patent should be read with these corrections therein that the same may conform to the record of the case in the Patent Office.

Signed and sealed this 14th day of September, A. D. 1948.

[SEAL]

THOMAS F. MURPHY,
*Assistant Commissioner of Patents.*